US009788352B2

(12) United States Patent
Xie et al.

(10) Patent No.: US 9,788,352 B2
(45) Date of Patent: Oct. 10, 2017

(54) SYSTEM AND METHOD FOR MULTIPLE WI-FI DEVICES AUTOMATICALLY CONNECTING TO SPECIFIED ACCESS POINT

(71) Applicant: SENGLED OPTOELECTRONICS CO., LTD., Tongxiang (CN)

(72) Inventors: Shengli Xie, Tongxiang (CN); Xiaoping Zhu, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 61 days.

(21) Appl. No.: 14/897,557

(22) PCT Filed: Apr. 27, 2015

(86) PCT No.: PCT/CN2015/077505
§ 371 (c)(1),
(2) Date: Dec. 10, 2015

(87) PCT Pub. No.: WO2015/172632
PCT Pub. Date: Nov. 19, 2015

(65) Prior Publication Data
US 2016/0143069 A1 May 19, 2016

(30) Foreign Application Priority Data
May 16, 2014 (CN) .......................... 2014 1 0208867

(51) Int. Cl.
*H04W 76/02* (2009.01)
*H04W 12/04* (2009.01)
(Continued)

(52) U.S. Cl.
CPC .......... *H04W 76/021* (2013.01); *H04L 63/06* (2013.01); *H04W 4/06* (2013.01); *H04W 12/02* (2013.01);
(Continued)

(58) Field of Classification Search
CPC ..... H04W 76/021; H04W 4/06; H04W 12/04; H04L 63/06
See application file for complete search history.

(56) References Cited

U.S. PATENT DOCUMENTS 9,467,818 B2 * 10/2016 O'Brien .................. H04W 4/06
2012/0239916 A1 * 9/2012 Malasani ............ H04L 41/0806
713/1
(Continued)

FOREIGN PATENT DOCUMENTS

CN 101044714 A 9/2007
CN 101640942 A 2/2010
(Continued)

OTHER PUBLICATIONS

The World Intellectual Property Organization (WIPO) International Search Report for PCT/CN2015/077505 dated Jul. 29, 2015.

*Primary Examiner* — Jamal Javaid
(74) *Attorney, Agent, or Firm* — Anova Law Group, PLLC

(57) ABSTRACT

Methods and systems for multiple Wireless Fidelity (Wi-Fi) devices automatically connecting to a specified access point (AP) are provided. The method includes defining an encryption field in a beacon frame. The encryption field contains connection information of the specified AP defined by a vendor and each of the multiple Wi-Fi devices is from the same vendor. The method also includes assigning respectively a key that decrypts the connection information of the specified AP contained in the encryption field to each Wi-Fi device, and broadcasting the connection information of the
(Continued)

| Field Name | Length |
|---|---|
| WI-FI AP SSID | Variable length <=32 Bytes |
| WI-FI AP Safe Mode | 4 Bytes |
| WI-FI AP Encryption Method | 4 Bytes |
| WI-FI AP Key | Variable length <=32 Bytes |
| WI-FI AP WEP Key Set | 132 Bytes | specified AP contained in the encryption field of the beacon frame by any AP containing the encryption field. Further, the method includes decrypting the connection information of the specified AP contained in the encryption field of the beacon frame by the multiple Wi-Fi devices having the key, such that the multiple Wi-Fi devices are connected to the specified AP.

9 Claims, 3 Drawing Sheets

(51) Int. Cl.
      *H04L 29/06*     (2006.01)
      *H04W 4/06*     (2009.01)
      *H04W 12/02*     (2009.01)
      *H04W 84/12*     (2009.01)
      *H04W 48/12*     (2009.01)

(52) U.S. Cl.
      CPC ............ *H04W 12/04* (2013.01); *H04W 48/12* (2013.01); *H04W 84/12* (2013.01)

(56) References Cited

U.S. PATENT DOCUMENTS

| | | | |
|---|---|---|---|
| 2013/0170432 A1 | 7/2013 | O'Brien et al. | |
| 2014/0355579 A1* | 12/2014 | Viswanathan | ........ H04W 4/001 370/338 |

FOREIGN PATENT DOCUMENTS

| | | |
|---|---|---|
| CN | 104010309 A | 8/2014 |
| CN | 104540126 A | 4/2015 |

* cited by examiner

| No. | Despcription | Length |
|---|---|---|
| 1 | Timestamp | 8 |
| 2 | Beacon Interval | 2 |
| 3 | Capability | 2 |
| 4 | Service Set dentifier(SSID) | 2-34 |
| 5 | Supported rates | 3-10 |
| 6 | Frequency-Hopping (FH) Parameter Set | 7 |
| 7 | DS Parameter Set | 3 |
| 8 | CF Parameter Set | 8 |
| 9 | IBSS Parameter Set | |
| 10 | Traffic indication map(TIM) | 4 |
| 11 | Country | 8-256 |
| 12 | FH Parameters | |
| 13 | FH Patern Table | |
| 14 | Power Constraint | 3 |
| 15 | Channel Switch Announcement | 5 |
| 16 | Quiet | 8 |
| 17 | IBSS DFS | 10-255 |
| 18 | TPC Report | 4 |
| 19 | ERP Information | 3 |
| 20 | Extended Supported Rates | 3-257 |
| 21 | RSN | 36-256 |
| 22 | BSSLoad | 7 |
| 23 | EDCA Parameter Set | 20 |
| 24 | Qos Capability | 3 |
| Last | Vendor Specific | |

FIG. 1
(Prior Art)

| Field Name | Length |
|---|---|
| WI-FI AP SSID | Variable length <=32 Bytes |
| WI-FI AP Safe Mode | 4 Bytes |
| WI-FI AP Encryption Method | 4 Bytes |
| WI-FI AP Key | Variable length <=32 Bytes |
| WI-FI AP WEP Key Set | 132 Bytes |

FIG. 2

SYSTEM AND METHOD FOR MULTIPLE WI-FI DEVICES AUTOMATICALLY CONNECTING TO SPECIFIED ACCESS POINT

CROSS-REFERENCES TO RELATED APPLICATIONS

This application is a national stage patent application of PCT application No. PCT/CN2015/077505, filed on Apr. 27, 2015. This application claims priority to Chinese Patent Application No. 201410208867.6, filed on May 16, 2014, the entire content of which is incorporated herein by reference.

FIELD OF THE INVENTION

The present disclosure generally relates to the field of wireless communication technology and, more particularly, relates to a system and method for multiple Wireless Fidelity (Wi-Fi) devices to automatically connect to a specified access point (AP).

BACKGROUND

Wireless Fidelity (Wi-Fi) technology is a technology that allows smart terminals (e.g., personal computers (PCs), tablet computers, smartphones, etc.) to connect together wirelessly. Almost all smartphones, tablet computers and laptops support Wi-Fi Internet access technology. The Wi-Fi technology is a most widely used wireless network transmission technology. Wi-Fi networks are based on the Institute of Electrical and Electronics Engineers (IEEE) 802.11 standards.

In a Wi-Fi network, all communications are implemented through an access point (AP). The AP provides a bridge from a wireless client to a local area network. In a wireless local area network (WLAN), the AP can also implement frame switching from wireless to wired network, or from wired to wireless network. The Wi-Fi technology uses 802.11 standards. In 802.11 standards, there are three common frames: management frames, control frames and data frames. A beacon frame is one of the management frames in IEEE 802.11 standards based WLANs.

The beacon frame contains all the information about the network. Beacon frames are transmitted periodically to announce the presence of an AP. According to IEEE 802.11 standards, a Wi-Fi AP broadcasts periodically the beacon frames to announce the presence of the AP. Wi-Fi devices can listen to the beacon frames within a signal transmitting range, thereby determining whether to join a certain Wi-Fi AP network. IEEE 802.11 std-2007 P80-P81 defines the standard format of the beacon frame, as shown in FIG. 1. As one of the wireless management frames, the beacon frames are periodically broadcasted to wireless clients by the AP. Each beacon frame contains information of a wireless service announced by the AP. After the wireless client receives the beacon frame, the wireless client analyzes the information of the wireless service contained in the beacon frame and uploads the information to an operation system, such that a user can select the wireless service according to actual needs.

With the development of Wi-Fi technology, more and more terminal devices use Wi-Fi technology for network connection. Both in a home environment and in public places, the Wi-Fi devices can be seen everywhere. In existing technologies, each Wi-Fi device can only be connected to an AP through configuring connection information. If multiple Wi-Fi devices produced by a same manufacturer/vendor want to connect to the Wi-Fi AP network of the same manufacturer/vendor, each Wi-Fi device needs to be configured with the connection information and the Wi-Fi devices are respectively connected to the Wi-Fi AP network. The network connection is not easy and fast, and a centralized control cannot be quickly implemented. Therefore, it is necessary to provide a system and method for multiple Wi-Fi devices automatically connecting to a specified AP.

The disclosed systems and methods for multiple Wi-Fi devices automatically connecting to a specified AP are directed to solve one or more problems set forth above and other problems.

BRIEF SUMMARY OF THE DISCLOSURE

One aspect of the present disclosure includes a method for multiple Wireless Fidelity (Wi-Fi) devices automatically connecting to a specified access point (AP). The method includes defining an encryption field in a beacon frame, wherein the encryption field contains connection information of the specified AP defined by a vendor and each of the multiple Wi-Fi devices is from the same vendor. The method also includes assigning respectively a key that decrypts the connection information of the specified AP contained in the encryption field to each Wi-Fi device, and broadcasting the connection information of the specified AP contained in the encryption field of the beacon frame by any AP containing the encryption field. Further, the method includes decrypting the connection information of the specified AP contained in the encryption field of the beacon frame by the multiple Wi-Fi devices having the key, such that the multiple Wi-Fi devices are connected to the specified AP.

Another aspect of the present disclosure includes a system for multiple Wi-Fi devices automatically connecting to a specified access point (AP). The system includes an AP configured to broadcast connection information of a specified AP through beacon frames, wherein an encryption field containing the connection information of the specified AP is customized by a vendor and is defined in each beacon frame. The system also includes multiple Wi-Fi devices from the same vendor configured to decrypt the connection information of the specified AP contained in the encryption field of the beacon frame using a key assigned by the vendor, such that the multiple Wi-Fi devices are connected to the specified AP.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1 illustrates a schematic diagram of an exemplary format of a beacon frame in existing technology;

FIG. 2 illustrates a schematic diagram of an exemplary data format of a connection information block before encryption consistent with the disclosed embodiments;

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 3:
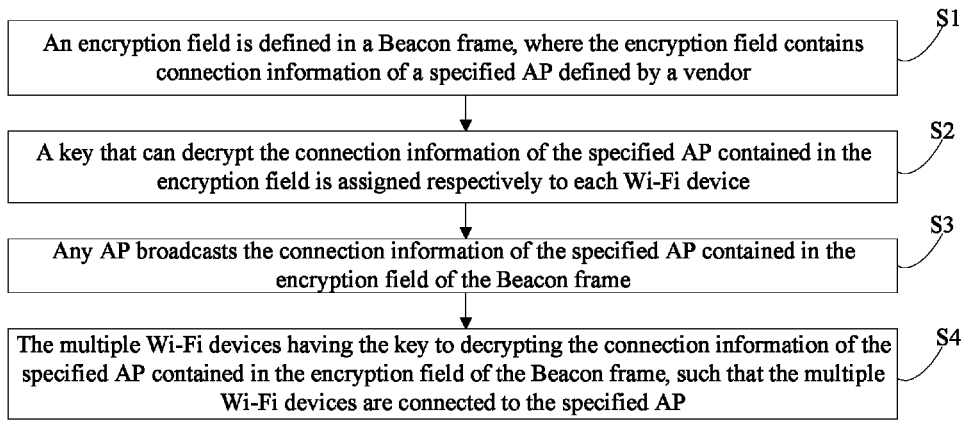
FIG. 3 illustrates a flow chart of an exemplary process for multiple Wi-Fi devices connecting to a specified AP consistent with the disclosed embodiments.

FIG. 3 illustrates a flow chart of an exemplary process for multiple Wi-Fi devices connecting to a specified AP (i.e., access point) consistent with the disclosed embodiments. The process is suitable for multiple Wi-Fi devices produced by a same vendor. As used herein, an AP can include any device with a transceiver that can support a wireless data link and communicate with one or more other electronic devices. As shown in FIG. 3, the process may include the following steps.

Step S1: an encryption field is defined in a beacon frame, where the encryption field contains connection information of the specified AP defined by the vendor.

Specifically, a vender specific field is defined in a beacon frame of IEEE 802.11 and is encrypted. The vender specific field is a custom field defined by the vendor, containing an Organizationally Unique Identifier (OUI) and a connection information block. An Organizationally Unique Identifier (OUI) is a 3-byte number that uniquely identifies a vendor, manufacturer, or other organization globally or worldwide. The OUI is assigned by IEEE. The connection information of the specified AP is stored in the connection information block. The connection information block is encrypted using Advanced Encryption Standard-128 (AES-128) and the maximum length of the connection information block does not exceed 220 bytes.

FIG. 2 illustrates a schematic diagram of an exemplary data format of a connection information block before encryption consistent with the disclosed embodiments. As shown in FIG. 2, before encryption, a data format of an original connection information block of the specified AP includes the following fields: Service Set Identifier (SSID), safe mode, encryption method, key and key set, where the Service Set ID (SSID) is an alphanumeric code that identifies a particular wireless network, and all the access points and client devices on the same network have the same SSID entered. In general, there are the following safe modes: Open-System authentication, Shared-Key authentication, Wi-Fi Protected Access-Pre-Shared Key (WPA-PSK), Wi-Fi Protected Access 2-Pre-Shared Key (WPA2-PSK), and Mixed WPA-PSK/WPA2-PSK. For example, WPA2-PSK mode is utilized in this disclosure. The encryption method may be Advanced Encryption Standard (AES), Temporal Key Integrity Protocol (TKIP) and Wired Equivalent Privacy (WEP).

Step S2: a key that can decrypt the connection information of the specified AP contained in the encryption field is assigned respectively to each Wi-Fi device. After the connection information block of the specified AP is encrypted using AES-128, the connection information block becomes ciphertext with maximum length no more than 220 bytes. The encryption key is a private key and is managed by the vendor. Therefore, a third party Wi-Fi device that is not authorized by the vendor cannot decrypt the connection information block of the specified AP.

Step S3: any AP broadcasts the connection information of the specified AP contained in the encryption field through broadcasting the beacon frame.

Step S4: the multiple Wi-Fi devices having the key decrypt the connection information of the specified AP contained in the encryption field of the beacon frame, such that the multiple Wi-Fi devices are connected to the specified AP.

Figure 4:
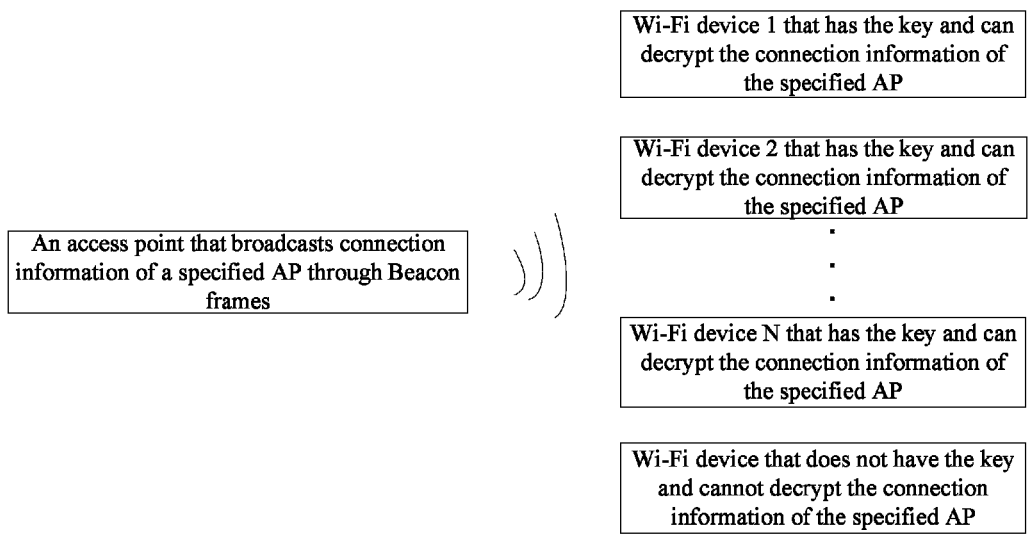
FIG. 4 illustrates a structure schematic diagram of an exemplary system for multiple Wi-Fi devices connecting to a specified AP consistent with the disclosed embodiments.
Figure 5:
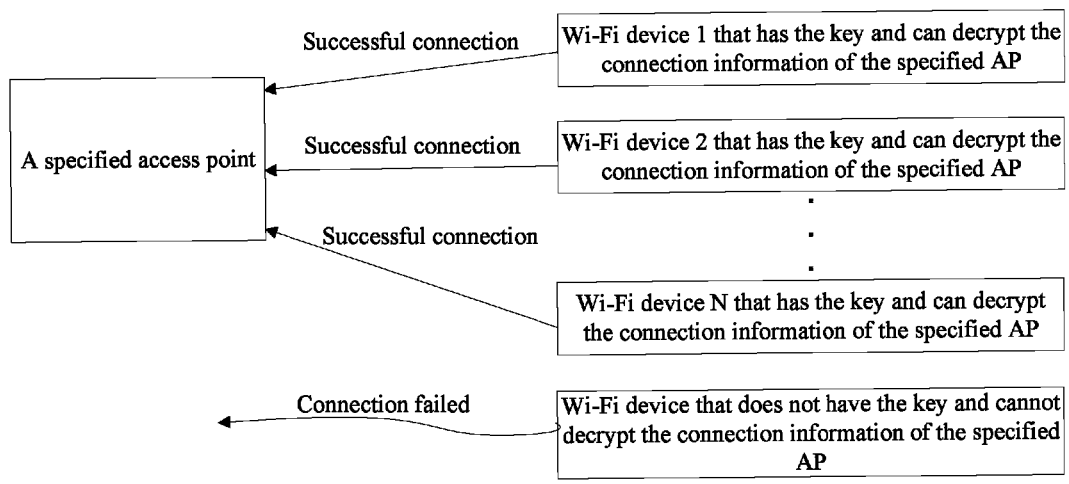
FIG. 5 illustrates a structure schematic diagram of another exemplary system for multiple Wi-Fi devices connecting to a specified AP consistent with the disclosed embodiments.

FIG. 4 illustrates a structure schematic diagram of an exemplary system for multiple Wi-Fi devices connecting to a specified AP consistent with the disclosed embodiments. FIG. 5 illustrates a structure schematic diagram of another exemplary system for multiple Wi-Fi devices connecting to a specified AP consistent with the disclosed embodiments.

As shown in FIG. 4 and FIG. 5, the system includes a Wi-Fi AP, and multiple Wi-Fi devices produced by a same vendor. Any AP broadcasts connection information of a specified AP through broadcasting beacon frames. The encryption field defined in each beacon frame is at the vendor specific field. The encryption field contains the connection information of the specified AP defined by the vendor. A key that can decrypt the connection information of the specified AP contained in the encryption field is assigned respectively to each Wi-Fi device. The multiple Wi-Fi devices (1, 2 . . . N) having the key decrypt the connection information of the specified AP contained in the encryption field of the beacon frame by using the key, such that the multiple Wi-Fi devices can be connected to the specified AP. Because the Wi-Fi devices without the key cannot decrypt the connection information of the specified AP, the Wi-Fi devices without the key cannot be connected to the specified AP.

It should be noted that the connection information of the specified AP broadcasted in the beacon frame may be the connection information of the AP that broadcasts this beacon frame, or may be the connection information of another Wi-Fi AP. Because each AP has its own SSID and key, if the beacon frame broadcasted by the AP contains the AP's own SSID and key, it indicates that the AP broadcasts its own connection information. After the Wi-Fi device decrypts the connection information successfully, the Wi-Fi device is directly connected to the AP that broadcasts the connection information. In certain circumstances, the AP that broadcasts the connection information may allow the Wi-Fi devices to connect to another specified Wi-Fi AP. Therefore, the beacon frame broadcasted by the AP contains the SSID and the key of another specified Wi-Fi AP.

Various embodiments also include a smart LED lighting device. As disclosed herein, APs (including the specific AP) containing the encryption field may be configured within a smart LED lighting device.

In one embodiment, the smart LED lighting device can include an LED light-emitting unit to emit light or to provide lighting, a power supply unit configured to drive the LED light-emitting unit and to provide power to the entire smart LED lighting device, an AP unit, and/or a controller unit.

The AP unit can include a variety of APs including the disclosed specific AP. The APs in the smart LED lighting device may be a wireless access point, e.g., with relay function. For example, Wi-Fi devices such as mobile terminals may be wirelessly and/or automatically connected to the specific AP in the AP unit of the smart LED lighting device. One exemplary mobile terminal may then send control instructions to the smart LED lighting devices via the AP unit.

The controller unit of the smart LED lighting devices can be configured to perform data processing of the control instructions, and to provide and transmit a control signal corresponding to the control instructions to the LED light-emitting unit, such that the lighting of LED light-emitting unit is controlled according to the control signal.

For example, the controller unit may send control signals to the power supply unit to adjust the emitted light from the LED light-emitting unit, for example, to adjust brightness, color, and color temperature of the emitted light corresponding to the status of the AP unit.

In one example, the brightness of the emitted light from the LED light-emitting unit may be changed (e.g., dimmed), when the connection, between the AP(s) in the AP unit of the smart LED lighting device and any Wi-Fi device(s), is unstable. In another example, the color and the color temperature of the emitted light from the LED light-emitting unit may be adjusted to indicate whether or not the "automatic" connection between the specific AP and certain group(s) or all of Wi-Fi devices has been established.

In some examples, the color of the emitted light can be controlled to be green to indicate an "automatic" connection, while the color of the emitted light can be controlled to be red to indicate an unconnected situation. In other examples, a flashing light may be provided by the LED light-emitting unit and controlled by the controller unit to indicate an abnormal condition of components within the smart LED lighting device and/or of any of the Wi-Fi device(s).

The embodiments disclosed herein are exemplary only. Other applications, advantages, alternations, modifications, or equivalents to the disclosed embodiments are obvious to those skilled in the art and are intended to be encompassed within the scope of the present disclosure.

Applicability and Advantageous Effects

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Compared with the existing technology, a vendor specific encryption field is defined in a beacon frame in IEEE 802.11 standards, where the vendor specific encryption field contains connection information (e.g., network name and security authentication information) of a specified AP. The beacon frame can be broadcasted by any Wi-Fi AP. After receiving the beacon frame, the Wi-Fi devices can identify the connection information, and the Wi-Fi devices can be connected to the specified Wi-Fi AP based on the connection information. The connection information of the Wi-Fi AP contained in the beacon frame is encrypted. Therefore, only the Wi-Fi devices having the key can decrypt the connection information of the specified Wi-Fi AP. By using the disclosed method, multiple Wi-Fi devices can automatically connecting to the specified Wi-Fi AP at a time.

The method and system is easy to use with high efficiency, thereby realizing centralized management and control of the multiple Wi-Fi devices.

What is claimed is:

1. A method for automatically connecting multiple Wi-Fi devices to a specified access point (AP), comprising:
   defining an encryption field in a beacon frame, wherein the encryption field contains connection information of the specified AP defined by a vendor, and each of the multiple Wi-Fi devices is from the same vendor;
   assigning respectively a key that decrypts the connection information of the specified AP contained in the encryption field to each Wi-Fi device;
   broadcasting, by any AP containing the encryption field, the connection information of the specified AP contained in the encryption field of the beacon frame; and
   decrypting the connection information of the specified AP contained in the encryption field of the beacon frame by the multiple Wi-Fi devices having the key, such that the multiple Wi-Fi devices are connected to the specified AP,
   wherein the encryption field is a vendor specific field containing an organizationally unique identifier (OUI) and a connection information block,
   the connection information is stored in the connection information block, and
   a data format of the connection information block includes a service set identifier (SSID) field, a safe mode field, an encryption method field, a key field and a key set field.

2. The method according to claim 1, wherein:
   the connection information block is encrypted using advanced encryption standard-1.28 (AES-128).

3. The method according to claim 1, wherein:
   the key is a private key and is preassigned to each Wi-Fi device by the vendor before going out from factory.

4. The method according to claim 1, wherein:
   the any AP containing the encryption field includes the specified AP, and
   the connection information of the specified AP contained in the beacon frame includes the connection information of the AP that broadcasts the beacon frame.

5. A system for automatically connecting multiple Wi-Fi devices to a specified access point (AP), comprising:
   an access point (AP) configured to broadcast connection information of a specified AP through beacon frames, wherein an encryption field containing the connection information of the specified AP is customized by a vendor and is defined in each beacon frame; and
   multiple Wi-Fi devices from the same vendor configured to decrypt the connection information of the specified AP contained in the encryption field of the beacon frame using a key assigned by the vendor, such that the multiple Wi-Fi devices are connected to the specified AP,
   wherein the encryption field is a vendor specific field containing an organizationally unique identifier (OUI) and a connection information block,
   the connection information is stored in the connection information block, and
   a data format of the connection information block includes a service set identifier (SSID) field, a safe mode field, an encryption method field, a key field and a key set field.

6. The system according to claim 5, wherein:
   the connection information block is encrypted using advanced encryption standard-128 (AES-128).

7. The system according to claim 5, wherein:
   the key is a private key and is preassigned to the multiple devices by the vendor before going out from factory.

8. The system according to claim 5, wherein:
   the AP configured to broadcast the connection information includes the specified AP, and the connection information of the specified AP contained in the beacon frame includes the connection information of the AP that broadcasts the beacon frame.

9. The system according to claim 5, wherein:
the AP configured to broadcast the connection information is not the specified AP.

* * * * *